UNITED STATES PATENT OFFICE.

OSWALD SCHARFENBERG AND WILHELM HERZBERG, OF SCHÖNEBERG, NEAR BERLIN, GERMANY, ASSIGNORS TO ACTIEN GESELLSCHAFT FÜR ANILIN FABRIKATION, OF BERLIN, GERMANY.

SULFURIZED DYES AND PROCESS OF MAKING SAME.

1,102,171.  Specification of Letters Patent. Patented June 30, 1914.

No Drawing.   Application filed February 26, 1912.   Serial No. 679,993.

*To all whom it may concern:*

Be it known that we, OSWALD SCHARFENBERG and WILHELM HERZBERG, citizens of the German Empire, residing at Schöneberg, near Berlin, Germany, our post-office addresses being, respectively, Wartburgstrasse and Landshuterstrasse 24, Schöneberg, near Berlin, Germany, have invented certain new and useful Improvements in Sulfurized Dyes and Processes of Making Same, of which the following is a specification.

In German Patent 243,545 as well as in French Patent 432,440 there is described the manufacture of new indophenols which on the one side contain a special kind of derivatives of 1.8-naphthylenediamin, and on the other side the rest of para-aminophenol or of a derivative thereof. The aforesaid special derivatives of 1.8-naphthylenediamin comprise among others perimidin derivatives of the following general structure:

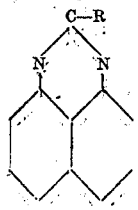

in which R means an inorganic substituent. If for instance R means a hydrogen atom the corresponding substance is the well known perimidin itself. If furthermore for instance R means an oxygen atom the diagram represents the dihydro-perimidon-2, and if R means a sulfur atom the diagram represents the dihydrothioperimidon-2.

The afore-named new indophenols are obtained by condensing the above-named class of heteronuclearic derivatives with quinonechlorimid or its derivatives or by joint oxidation with para-aminophenol or its derivatives. Now according to our present invention these new indophenols may be converted into very valuable new dyes containing sulfur by acting with an alkali-polysulfid containing a high or low percentage of sulfur; in manufacturing such new dyes a suitable solvent, such as alcohol or a suitable diluent, may be added. As to the tints obtained with the new dyestuffs these vary, generally speaking, from dark green to dark The following example may serve to illustrate our invention, the parts being by weight: Into a mixture of 70 parts of alcohol, 40 parts of a solution of sodium sulfid, containing 22% of the sulfid, and 13 parts of sulfur there are introduced 14 parts of the indophenol prepared from perimidin and para-aminophenol, which indophenol is represented by the following formula:

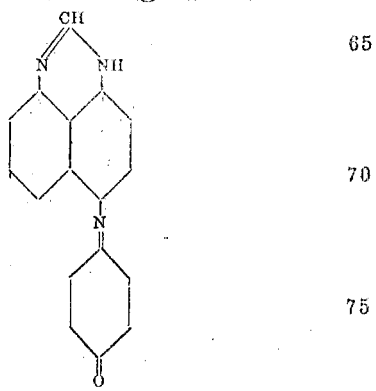

This mass is then heated to boiling for about 60 hours using a reflux condenser, whereupon the alcohol is eliminated by distillation and the residue diluted with water; the greater part of the new dyestuff remains undissolved as a green-black powder and the rest can be isolated in the usual manner, for instance by introducing a current of air. The new dye thus obtained produces on cotton from a bath, containing an alkali-sulfid, a blackish full green possessing a full shade over hand and a good fastness.

The new dye as above obtained forms in the dry state a dark powder which is insoluble in concentrated sulfuric acid, alcohol, benzene, ether and other usual organic solvents. It dissolves in a sodium sulfid solution to a gray-green colored solution from which cotton is dyed in the tint above given. The new dye dissolves also in an alkaline hydro-sulfite solution to a brownish yellow colored solution from which by oxidation the original dye is formed.

Of course it is obvious that the present invention is not limited to the foregoing example or to the details given therein. It may be stated for instance that instead of the indophenol used in the above example another indophenol of the class defined on page 1 of the specification may be employed;

thus for instance from the indophenol derived from 2.6-dichloro-para-aminophenol and 2-methyl-perimidin a sulfur dye can be obtained which produces on cotton a dark full green possessing a full shade overhand and a good fastness, whereas the indophenol derived from dihydrothioperimidone-2 and dichlorquinone-chlorimid gives a sulfur dye which dyes cotton dull olive green tints. It is obvious that in using such other indophenols the proportions of the ingredients as well as the other special conditions of reaction may be altered in order to obtain the best results. For instance the reaction may be performed in the presence of a solvent other than alcohol or of a suitable diluent, or other alkali-polysulfids than that named in the foregoing example. Finally it is to be stated that instead of the indophenols above cited the corresponding leuco compounds can be used in order to produce the new dyes.

Now what we claim is,—

1. The process of manufacturing new sulfur dyes comprising acting with a polysulfid upon indophenols obtainable from a perimidin compound having the following general structure:

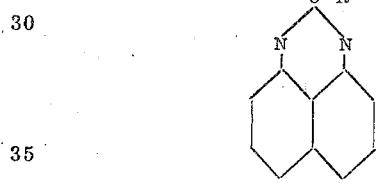

in which R means an inorganic substituent, and from a para-aminophenol.

2. The process of manufacturing new sulfur dyes comprising acting with a polysulfid upon indophenols obtainable from a perimidin compound having the following general structure:

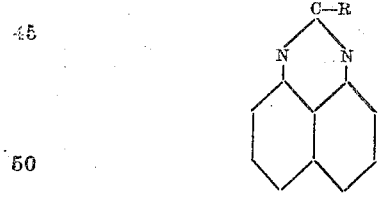

in which R means a hydrogen atom, and from a para-aminophenol.

3. The process of manufacturing new sulfur dyes comprising acting with a polysulfid upon indophenols obtainable from a perimidin and a para-aminophenol.

4. The process of manufacturing new sulfur dyes, comprising acting with a polysulfid upon the indophenol which derives from perimidin and para-aminophenol.

5. The hereinbefore-described manufacture of new sulfur dyes comprising acting with a polysulfid of a high percentage of sulfur in the presence of a suitable liquid upon the indophenol which derives from perimidin and para-aminophenol.

6. The process of manufacturing new sulfur dyes, comprising acting with a polysulfid of a high percentage of sulfur in the presence of a solvent upon the indophenol which derives from perimidin and para-aminophenol.

7. The hereinbefore-described manufacture of new sulfur dyes, comprising acting with a polysulfid of a high percentage of sulfur in the presence of water and alcohol upon the indophenol which derives from perimidin and para-aminophenol.

8. The hereinbefore-described new sulfur dyes being sulfur containing derivatives of indophenols obtainable from a perimidin compound having the following general structure:

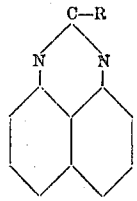

in which R means an inorganic substituent, and from a para-aminophenol, and which new dyes being in the dry shape when pulverized dark powders insoluble in the usual solvents but being soluble in an alkali sulfid solution to, generally speaking, green solutions and being soluble in an alkaline hydrosulfite solution to, generally speaking, brown-yellow solutions, and these new sulfur dyes producing on cotton from a bath containing an alkali sulfid, generally speaking, green tints.

9. The hereinbefore-described new sulfur dyes being sulfur containing derivatives of indophenols obtainable from a perimidin compound having the following general structure:

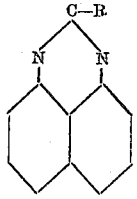

in which R means a hydrogen atom, and from a para-aminophenol, and which new dyes are in the dry shape when pulverized dark powders insoluble in concentrated sulfuric acid, alcohol, benzene, ether and the other usual solvents, and being soluble in a sodium sulfid solution to gray-green to blackish green solutions and being soluble in an alkaline hydrosulfite solution to brownish yellow solutions and these new sulfur dyes producing on cotton from a bath containing an alkali-sulfid, generally speaking, dark green to dark olive-green tints.

10. The hereinbefore described new sulfur dyes being sulfur containing derivatives of indophenols obtainable from a perimidin compound having the following general structure:

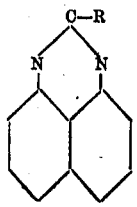

in which R means a substituent, and from a para-aminophenol, these new dyes being when dried and pulverized dark powders soluble in an alkali-sulfid solution generally with a green coloration, and dyeing cotton green shades, substantially as described.

11. As a new article of manufacture the new sulfur dye representing a sulfurized derivative of the indophenol derived from perimidin and para-aminophenol, which new dye in the dry shape when pulverized is a dark powder insoluble in concentrated sulfuric acid, alcohol, benzene, ether and the other usual solvents and is soluble in a sodium sulfid solution to a gray-green solution and is soluble in an alkaline hydrosulfite solution to a brownish-yellow solution, and this new dye producing on cotton from a bath containing an alkali-sulfid a blackish full green possessing a full shade overhand and a good fastness.

In testimony whereof we have hereunto set our hands in presence of two subscribing witnesses.

OSWALD SCHARFENBERG.
WILHELM HERZBERG.

Witnesses:
HENRY HASPER,
WOLDEMAR HAUPT.